Figure 1:
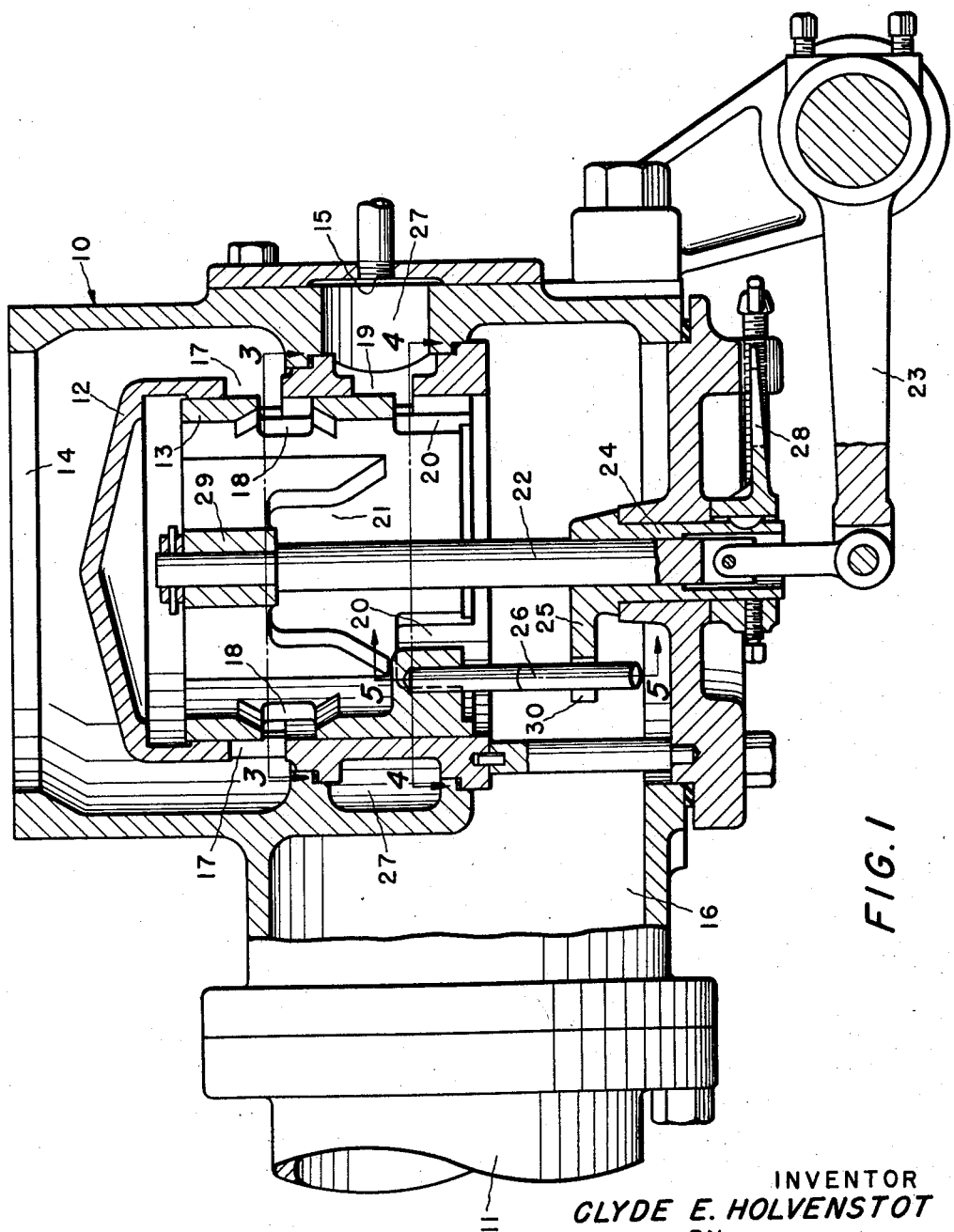

Dec. 29, 1959     C. E. HOLVENSTOT     2,918,939
FUEL-AIR MIXING VALVE

Filed March 11, 1957     2 Sheets-Sheet 1

INVENTOR
CLYDE E. HOLVENSTOT
BY
HIS ATTORNEY

Dec. 29, 1959     C. E. HOLVENSTOT     2,918,939
FUEL-AIR MIXING VALVE
Filed March 11, 1957     2 Sheets-Sheet 2
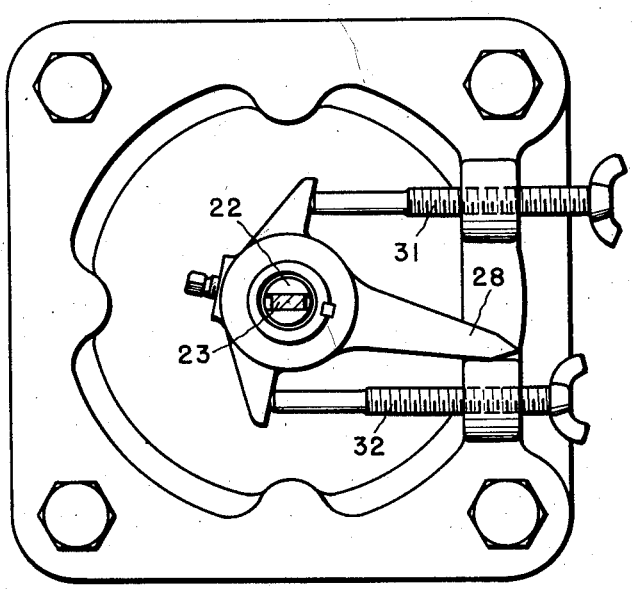
FIG. 2
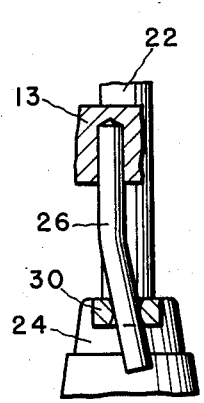
FIG. 5
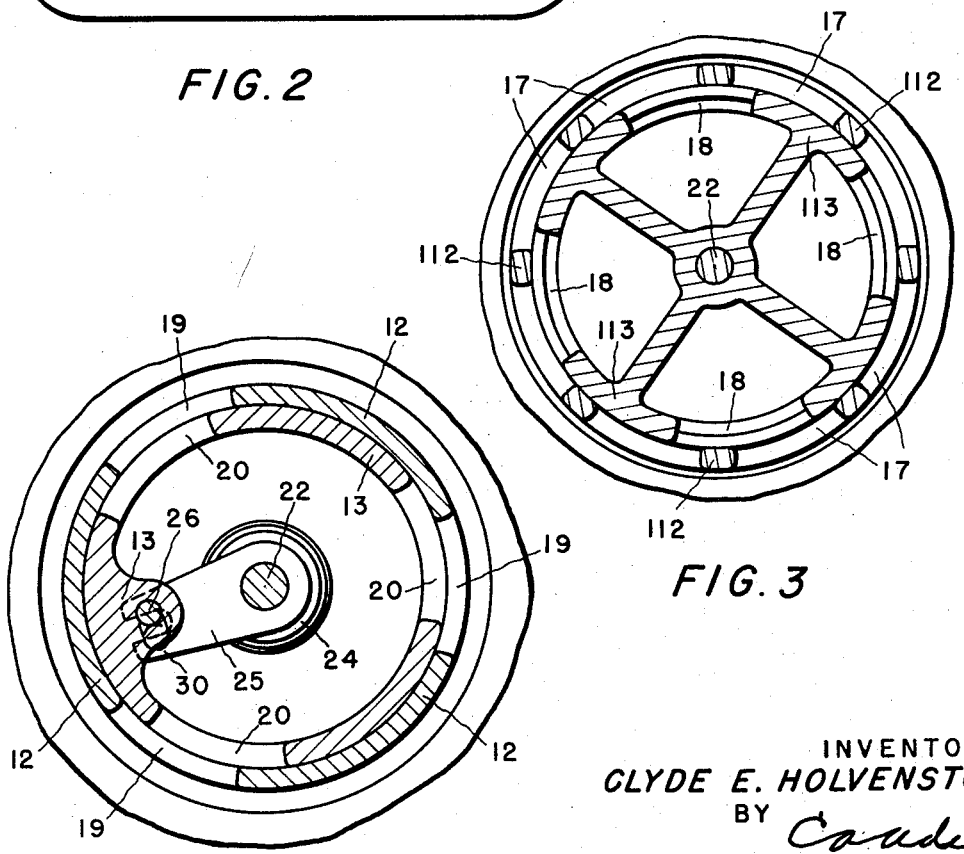
FIG. 3
FIG. 4
INVENTOR
CLYDE E. HOLVENSTOT
BY
HIS ATTORNEY

United States Patent Office 2,918,939
Patented Dec. 29, 1959

2,918,939

FUEL-AIR MIXING VALVE

Clyde E. Holvenstot, Corning, N.Y., assignor to Ingersoll-Rand Company, New York, N.Y., a corporation of New Jersey Application March 11, 1957, Serial No. 645,111

4 Claims. (Cl. 137—625.17)

This invention relates to an automatic gas-air ratio regulating device for internal-combustion engines and adaptable to conventional type constant quality gas-air mixing valves.

An object of this invention is to vary automatically the ratio of gas-air mixture to be provided to the engine in accordance with its load demands.

Another object is to provide a valve for combining mixing, throttling and automatic ratio varying of gas and air to be supplied to an engine.

Further objects will become apparent from the following descriptions and drawings in which:

Fig. 1 is a longitudinal sectional view of the gas-air mixing valve for feeding a required mixture of gas and air to the engine, Fig. 2 is a front view of the gas-air mixing valve showing the pointer and the adjusting screws of the mixing valve shown in Fig. 1, Fig. 3 is a cross-sectional view of Fig. 1 taken along the line 3—3 looking in the direction of the arrows, Fig. 4 is a cross-sectional view of Fig. 1 taken along the line 4—4 looking in the direction of the arrows, and Fig. 5 is a longitudinal sectional view of Fig. 1 taken along the line 5—5 looking in the direction of the arrows and showing the curved pin, constructed and positioned in accordance with the invention.

Referring to the drawings, Fig. 1 shows a conventional type constant quality gas-air mixing valve adapted for automatically effecting the desired gas-air quality according to the load demand of the engine.

The mixing valve shown in Fig. 1, is adapted for use on gas engines for feeding a desired mixture of gas and air to the power cylinders of the engine (not shown). The mixing valve comprises a housing 10 with an air inlet 14, a gas inlet 15 and a gas-air mixture outlet 16 for admitting the gas-air mixture to an engine (not shown) through a manifold 11. Mounted in the housing 10 is a cylindrical casing 12 provided with openings 17 for admitting air from the air inlet 14 to a mixing chamber 21, and ports 19 for admitting gas from the gas inlet 15 through a distribution channel 27 to the mixing chamber 21. The distribution channel 27 completely encircles the casing 12 and is positioned so as to prevent gas from mixing with the air before entering the mixing chamber 21.

To control the flow through the gas ports 19 and air openings 17 to the mixing chamber 21, the casing 12 is provided with a valve 13 slidably and rotatably fitting therein and provided with openings 18 overlapping the openings 17 and ports 20 overlapping the ports 19.

The position of the valve 13 may be varied by means of any conventional type speed governor (not shown), driven by the engine for controlling the engine speed, for reciprocating the valve 13 through the linkage 23 and the rod 22 connected to the head 29 of the valve 13. The area of communication between the openings 17 and openings 18 and between the ports 19 and 20 is varied proportionately to each other, by reciprocal movement of the valve. With this construction, then, such reciprocation causes a variation in the quantity but not the ratio of the gas and air passing through the openings and ports to the mixing chamber 21.

Adjustment of the gas-air ratio in accordance with the B.t.u. value of the gas to be used for operating the engine, is obtained by manually rotating the valve 13 for exposing more or less of the ports 19 to the ports 20 thereby increasing or decreasing the flow area therethrough to increase or decrease the flow of gas through the ports 19 and ports 20 to the mixing chamber 21. In furtherance to this end, the ports 19 are each formed more or less square shaped and displaced peripherically at equal distances from each other. The ports 20 are similarly shaped and spaced. Thus, rotation of the valve 13 will vary the length of the communication area therebetween, while reciprocation of the valve 13 will vary the height of the communication area. Rotation of the valve 13 will not affect the communication area through the openings 17 and openings 18 as both groups of openings are elongated traverse apertures completely encircling the casing 12 and the valve 13 except for the reinforcement ribs 112 and 113, Fig. 3, and positioned parallelly with respect to each other.

The aforementioned adjustment is effected by manually turning the pointer 28 connected to the bushing 24 which is provided with a guide 25 including a forked portion 30. The pin 26, fixedly connected to the valve 13 and its free end extending through the forked portion 30 of the guide 25, will then be moved causing the valve 13 to rotate according to the turning of the pointer 28.

After adjusting the pointer 28 to a point corresponding with the desired position of the valve 13 this position can be maintained by screwing down the adjusting screws 31 and 32 on the wings of the pointer 28 thus maintaining the guide 25 in a stationary position with respect to the pin 26 of the valve 13.

The use of a conventional mixing valve for supplying a gas-air mixture of constant quality to an engine operating under various loads cannot obtain maximum fuel economy and engine performance, for with the conventional type constant quality mixing valve the ratio of the gas-air mixture is not changeable when the engine is operating. The present invention overcomes this disadvantage by the provision of cam means to actuate the mixing valve for automatically varying the ratio of the gas-air mixture corresponding with the load demands of the engine.

To this end said cam means is provided whereby a combined motion of the valve 13 is obtained such that the valve 13 reciprocates and rotates simultaneously, moving approximately spiral wise upward or downward. This combined motion varies the areas of communications formed by the overlapping openings 17 and 18 and the overlapping ports 19 and 20 automatically causing the gas and the air to flow in various proportions therethrough. The quantity as well as the quality of the gas-air mixture obtained by this new arrangement ranges from a constant quality mixture to mixtures with predetermined ratios, depending on the form of the cam, when the motor operates under various loads.

In the form shown in Figures 1, 3, 4 and 5 the cam means comprises a pin 26 curved in accordance with the requirements of the invention, fixedly connected to the valve 13 and its free end extending through a forked portion 30 of the stationary guide 25.

For an illustration of the function of the new automatic control valve, assume the engine is operating under various loads. The governor will cause the valve 13 to reciprocate in response to the variations of the engine load. As a result thereof the pin 26 reciprocates in the forked portion of the stationary guide 25 and as the pin 26 is curved this motion causes the valve 13 to be cammed rotatively.

The combined motion of the valve 13 rotating and reciprocating simultaneously will vary the flow areas of the related ports and openings. The quantitative variation in flow of air and gas is due to the reciprocating motion of the valve 13, the rotating motion of the valve 13 additionally varies the flow of gas only while the flow of air remains constant, changing the ratio of the gas-air mixture. This will cause the "quality" as well as the "quantity" of the gas-air mixture to vary in accordance with the load demands of the engine.

Reviewing briefly the operation of the invention, assume that the engine (not shown) is running under moderate load and that this load is changed such that the speed governor (not shown) will raise the valve 13, as explained in the foregoing description, increasing the supply of gas-air mixture to the engine (not shown). In the form of the invention illustrated in Fig. 5 the quality of the gas-air mixture will be varied by the specific function of the curved pin 26 in cooperation with the stationary guide 25 effecting a combined simultaneous reciprocating and rotating motion of the valve 13. This motion will vary automatically the quantity of the gas-air mixture as well as its ratio from "lean" to "rich" or conversely in accordance with the load demands of the engine.

The shape of the pin 26 is adapted to effect a varying of flow of constant gas-air mixture and a varying of the quality as well as quantity of the gas-air mixture at predetermined parts of the load range. It is to be noted that the shape of the pin 26 may vary from slightly curved, as shown in Fig. 5, to totally arcuate or partly arcuate and partly straight depending on the fuel used and operating conditions of the engine to obtain maximum fuel economy and engine performance.

While I have shown and described specific forms of my invention, it is to be understood that various changes and modifications may be made without departing from the spirit of the invention as set forth in the appended claims.

I claim:

1. The combination of a valve for controlling the flow of two different fluids, said valve including a casing element and a valve element, said elements having communicating openings for one of such fluids being of extensive arcuate expanse sufficient to maintain existing communication when relatively rotationally displaced and communicating ports for the other of such fluids being of limited arcuate expanse that relative rotational displacement will vary the communication therethrough, one of said elements being rotatable relative to the other of said elements for varying only the area of communication between said ports to vary the flow rate of only one fluid relative to the other, said one element being actuated longitudinally relative to said other element for varying the area of communication between the openings and between the ports, and cam means operatively connected to said one element and operative as a result of longitudinal movement of said one element to cause simultaneous rotation thereof.

2. The control valve claimed in claim 1 in which said cam means comprises a curved pin radially disposed from the axis of the valve and fixedly supported by said one element, and a stationary guide fixedly positioned with regard to said curved pin for guiding the curved pin to cam said one element rotatively with regard to said other element.

3. The combination of a valve for controlling the flow of two different fluids, said valve including a casing element and a valve element, said elements having communicating openings for one of such fluids being of extensive arcuate expanse sufficient to maintain existing communication when relatively rotationally displaced and communicating ports for the other of such fluids being of limited arcuate expanse that relative rotational displacement will vary the communication therethrough, one of said elements being rotatable relative to the other of said elements for varying only the area of communication between said ports to vary the flow rate of only one fluid relative to the other, said one element being movable longitudinally relative to said other element for varying the area of communication between the openings and between the ports, cam means operatively connected to said one of the elements to cause rotary motion thereof when it is moved longitudinally, and means for rotatably adjusting said cam means to only rotate said one element without corresponding longitudinal movement of said one element.

4. The valve claimed in claim 3 in which said cam means includes a stationary guide and a pin cooperating with said guide and having a curved portion and a straight portion so that said one of the elements is rotated during part of the longitudinal stroke thereof and is held against such rotation during the remainder of such stroke.

References Cited in the file of this patent

UNITED STATES PATENTS

| | | |
|---|---|---|
| 1,357,294 | McKee | Mar. 2, 1920 |
| 1,479,544 | Johnson | Jan. 1, 1924 |
| 1,489,709 | O'Flaherty | Apr. 8, 1924 |
| 1,693,758 | Hennessey | Dec. 4, 1928 |
| 2,486,017 | Furkert | Oct. 25, 1949 |

FOREIGN PATENTS

| | | |
|---|---|---|
| 685,886 | Great Britain | Jan. 14, 1953 |